July 19, 1938.  N. H. GILMAN  2,124,060
METHOD OF MAKING BRONZE FACED BEARINGS
Original Filed May 22, 1935
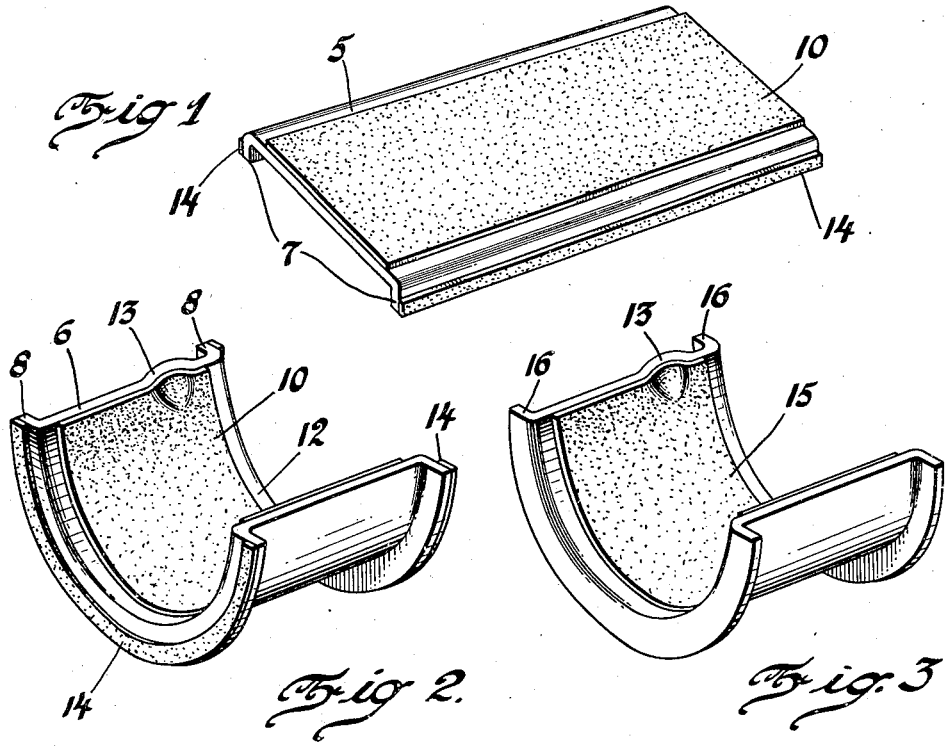
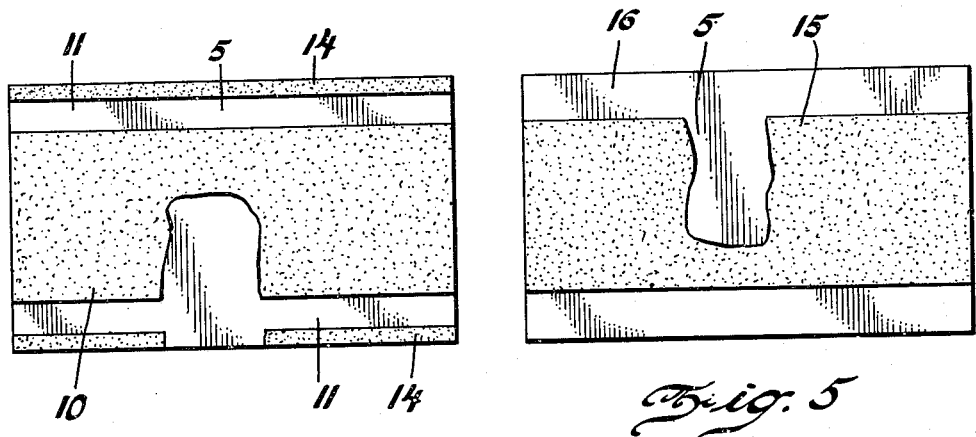
Inventor
Norman H. Gilman
By Blackmore, Spencer & Flint
Attorneys Patented July 19, 1938

2,124,060

UNITED STATES PATENT OFFICE 2,124,060

METHOD OF MAKING BRONZE FACED BEARINGS

Norman H. Gilman, Indianapolis, Ind., assignor to General Motors Corporation, Detroit, Mich., a corporation of Delaware Original application May 22, 1935, Serial No. 22,712. Divided and this application June 24, 1936, Serial No. 86,934

3 Claims. (Cl. 29—149.5)

My invention relates to semi-cylindrical half bearings designed to fit within seats of like form provided at the big ends of piston or connecting rods and in cooperating bearing retaining caps, or made use of for supporting crank shafts, or elsewhere where bearings are required; and particularly to bearings made up of a strong supporting back to which a thin bearing layer of plastic bronze is welded or fused, so as to be inseparable therefrom and in effect an integral part thereof, and which layer forms the bearing surface of the bearing. Plastic bronze is an alloy or composition of which copper and lead make up substantially the whole thereof although minute quantities of other ingredients, such for example, as tin or nickel may also be present therein, typical proportions being from 70 parts copper and 30 parts lead, to 50 parts copper and 50 parts lead; other materials when present being present to the extent of a few per cent as a maximum, so that the alloy or composition may be regarded as made up entirely of copper and lead. Bearings having wearing facings or bearing layers composed of copper combined with a large percentage of lead, that is bearing layers of plastic bronze, have given especially good satisfaction when used as bearings for airplane and automobile engines wherein the speed is unusually high, and wherein the bearings are subjected to inordinately high loads.

Bearings such as are herein contemplated are made from oblong flat bearing forming strips comprising a supporting back of steel or equivalent strong material to impart strength to the same, and a plastic bronze bearing layer or facing fused or welded to the back, so as to be in effect integral therewith; the sides of the strips being bent at right angles to the body thereof to provide side flanges in the finished bearings and the flanged channel-shaped strips thus formed being bent longitudinally into semi-cylindrical form and subjected to the requisite finishing operations to complete the bearings. Plastic bronze while an excellent bearing material is too soft and plastic to be used in layers of substantial thickness, and is brittle and deficient in strength, which is the reason why the bearing layer is fused or welded to the back which provides the required strength in the finished bearing. The plastic bronze layer is likely to be cracked during the bending of the sides of the bearing strip to provide side flanges for the finished bearing, thus presenting an unsightly appearance, although the bond between the bearing layer and the supporting back is so strong that particles of the layer will not become loosened from the back and fall away therefrom during the bending of the sides; and the object of my invention is to avoid such unsightly appearance along the localities where the semi-cylindrical part of the bearings merges with the radially extending side flanges of the finished bearings.

The drawing accompanying and forming a part of this application illustrates the preferred form of my invention, and the particular features wherein the same consists are particularly pointed out in the claims at the end of this specification; this present application being a division of my application Serial Number 22,712, filed May 22, 1935.

In the drawing:

Figure 1 is a perspective view showing a flanged channel-shaped bearing strip from which the bearing shown in Figure 2 is made.

Figure 2 is a perspective view showing a bearing made from the bearing strip shown in Figure 1.

Figure 3 is a view showing my invention embodied in a bearing of slightly different form than the one shown in Figure 2.

Figure 4 is a view showing a bearing strip before the side flanges shown in Figure 1 are formed, and Figure 5 is a view showing a bearing strip of the form used in making the bearing shown in Figure 3.

Referring now to the drawing, the bearing strip shown in Figure 1 is made from a flat strip 5 of iron or steel or equivalent material which provides the back 6 of the finished bearing and contributes the requisite strength thereto, the sides of said strip having been bent at right angles as at 7 to provide the side flanges 8 of the finished bearing shown in Figure 2. This strip initially (before the flanges 7 are formed) is flat throughout, and has a thin bearing layer 10 of plastic bronze fused or welded to one of its surfaces, so as to be inseparable therefrom and integral therewith, such a strip being shown in Figure 4; and before the flanges 7 are bent at right angles to the body thereof narrow longitudinally extending strips of the plastic bronze bearing layer are removed to provide grooves 11 adjacent the sides of the strip. These grooves are so related to the finished bearing that when the sides of the flat strip are bent (as indicated at 7, Figure 1) to provide the side flanges 8 of the finished bearing, there will be no plastic bronze along the zones where the side flanges merge with the back 6, as indicated at 12, Figure 2; and the reason for forming grooves 11 in the plastic bronze layer is to avoid a cracked and broken appearance therein due to the bending of the sides of the strip to form the flanges 7. The plastic bronze layer having been removed along the grooves it follows that no broken appearance results from the bending of the side edges of the bearing strip as shown in Figure 1, and no such cracked or broken up plastic bronze layer is present along the zones 12 of the finished bearing where the side flanges 8 merge with the back 6 thereof.

The straight flanged or channel-like strip shown in Figure 1 is next bent into semi-cylindrical form to produce the bearing shown in Figure 2 by suitable bending and forming dies not herein illustrated, as bending means forms no part of the invention to which this present application relates. The bearing ordinarily requires further finishing as by boring pairs of bearings held together to a predetermined internal diameter, and grinding them exteriorly to fit within seats of predetermined diameter. The bearings illustrated have struck-out projections 13 to prevent them from turning in their seats which feature, however, is not claimed in this present application. In bearings for automobile and similar engines the thickness of the back 6 is ordinarily around $\frac{1}{16}''$, and that of the finished plastic bronze bearing layer around $\frac{1}{32}''$ or less; this layer being so thin that it has no strength in itself and is capable of use as a bearing surface only when it is inseparably secured to a supporting back as by being fused or welded thereto.

In the bearing strip illustrated in Figure 1 and because the grooves 11 are disposed inward from the side edges of the steel or equivalent back 5 the entire surface of which was covered by the plastic bronze bearing layer annular rings 14 of plastic bronze are present upon the radially extending side flanges 8 of the finished bearing, which is a feature of advantage when the bearing has to resist thrust forces of considerable magnitude. In the bearing strip used in making the bearing shown in Figure 3, however, the plastic bronze bearing layer upon each side of the central part 15 thereof is entirely removed, as indicated at 16 in Figure 5, so that the radially extending side flanges 16 of this second form of bearing have no facings of plastic bronze. Except for this difference the bearings illustrated in Figures 2 and 3 are identical with one another and have the same characteristics, and are made in the same way by first bending sides of a bearing strip outward to provide for side flanges in a finished bearing, and then bending the resulting channel-shaped strip into semi-cylindrical form as shown in said figures.

As above appears, the entire thickness of the plastic bronze layer is removed along the grooves 11 in Figure 4, and along the side parts 16 in Figure 5 or, rather, substantially the entire thickness of the layer is removed. The matter is stated this way because the planning, broaching, milling or like operation whereby the layer is removed may not remove absolutely all the layer as the copper thereof alloys with the steel back 5 and a characteristic copper color sometimes remains at some parts of bottom of the groove 5 and the sides 16. The layer, however, is removed as completely as possible, and if any remains it is of copper alloyed with the metal of the back, and is not cracked or broken during the formation of the side flanges as hereinbefore explained.

Having thus described and explained my invention I claim and desire to secure by Letters Patent:

1. The method of making a bearing which consists in fusing or welding a plastic bronze bearing layer to a flat supporting bearing strip; removing substantially the entire thickness of portions of said bearing layer along the sides of said bearing strip; bending the sides of said bearing strip along the zones where said bearing layer has been removed at right angles to the body of said strip to form a channel-shaped member; and bending said channel-shaped member into semi-cylindrical form.

2. The method of making a bearing which consists in fusing or welding a plastic bronze bearing layer to a flat supporting bearing strip; removing substantially the entire thickness of portions of said bearing layer along grooves extending longitudinally of said bearing strip and located adjacent the sides thereof; bending the sides of said bearing strip along the grooves where said bearing layer has been removed at right angles to the body of said strip to form a channel-shaped member; and bending said channel-shaped member into semi-cylindrical form.

3. The method of making a bearing which consists in fusing or welding a bronze bearing layer to a flat supporting bearing strip; removing substantially the entire thickness of said layer along a side of said bearing strip; bending said strip along the zone where said bearing layer has been removed at right angles to the body of the strip to form a flange extending along said strip; and bending said strip and flange into semi-cylindrical form.

NORMAN H. GILMAN.